(12) United States Patent
Park et al.

(10) Patent No.: US 9,954,959 B2
(45) Date of Patent: Apr. 24, 2018

(54) METHOD AND APPARATUS FOR CONTROLLING ELECTRONIC DEVICES IN PROXIMITY

(71) Applicant: Samsung Electronics Co., Ltd., Gyeonggi-do (KR)

(72) Inventors: Kenhyung Park, Gyeonggi-do (KR); Kyunghee Lee, Gyeonggi-do (KR); Chihyun Cho, Gyeonggi-do (KR); Changryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 464 days.

(21) Appl. No.: 14/582,478

(22) Filed: Dec. 24, 2014

(65) Prior Publication Data

US 2015/0188997 A1  Jul. 2, 2015

(30) Foreign Application Priority Data

Jan. 2, 2014 (KR) .......................... 10-2014-0000427

(51) Int. Cl.
*G06F 15/16* (2006.01)
*H04L 29/08* (2006.01)
(Continued)

(52) U.S. Cl.
CPC .............. *H04L 67/18* (2013.01); *G06F 1/163* (2013.01); *G06F 1/1694* (2013.01); *G06F 3/017* (2013.01);
(Continued)

(58) Field of Classification Search
CPC ....... H04L 67/18; H04L 67/125; G06F 1/163; G06F 1/1694; G06F 3/017; G06F 3/038
(Continued)

(56) References Cited

U.S. PATENT DOCUMENTS 8,275,893 B1\* 9/2012 Chi .................... G02B 27/01
709/201
2002/0052963 A1  5/2002 Abbott et al.
(Continued)

FOREIGN PATENT DOCUMENTS

WO    2013/063787 A1    5/2013

*Primary Examiner* — Glenton B Burgess
*Assistant Examiner* — Imran Moorad
(74) *Attorney, Agent, or Firm* — Cha & Reiter, LLC.

(57) ABSTRACT

An electronic device and method are disclosed, including a communication interface adapted to allow communicative coupling with a plurality of electronic devices, and a processor, implementing the method, which includes: identifying an application to be executed in the first electronic device, selecting candidate devices from the plurality of electronic devices having at least one function associated with execution of the application, selecting a second electronic device from among the candidate devices based a factor including at least one of: status information of each of the candidate devices, position information of each of the candidate devices in relation to at least one of a user or the first electronic device, and at least one property of data associated with the at least one function of the candidate devices, and executing the application in the first electronic device utilizing the at least one function of the second electronic device.

18 Claims, 8 Drawing Sheets

(51) Int. Cl.
*G06F 1/16* (2006.01)
*G06F 3/038* (2013.01)
*G06F 3/01* (2006.01)

(52) U.S. Cl.
CPC ............ *G06F 3/038* (2013.01); *H04L 67/125*
(2013.01); *G06F 2200/1637* (2013.01)

(58) Field of Classification Search
USPC .......................................................... 709/201
See application file for complete search history.

(56) References Cited

U.S. PATENT DOCUMENTS

| | | | |
|---|---|---|---|
| 2005/0212911 A1* | 9/2005 | Marvit .................... | G06F 3/017 348/154 |
| 2006/0229014 A1* | 10/2006 | Harada ............... | H04M 1/7253 455/41.2 |
| 2010/0331017 A1* | 12/2010 | Ariga .................... | G01S 5/0263 455/456.3 |
| 2011/0054833 A1 | 3/2011 | Mucignat | |
| 2011/0254683 A1* | 10/2011 | Soldan .................... | G01S 19/49 340/539.13 |
| 2013/0114504 A1* | 5/2013 | Zhao .................... | H04W 76/02 370/328 |
| 2014/0379946 A1 | 12/2014 | Zhang et al. | |

* cited by examiner

341

343

345

347

METHOD AND APPARATUS FOR CONTROLLING ELECTRONIC DEVICES IN PROXIMITY

CROSS-REFERENCE TO RELATED APPLICATION'

This application claims priority from and the benefit under 35 U.S.C. § 119(a) of Korean Patent Application No. 10-2014-0000427, filed on Jan. 2, 2014, which is hereby incorporated by reference for all purposes as if fully set forth herein.

TECHNICAL FIELD

Various embodiments relate generally to a method and an apparatus for controlling one or more devices in proximity, for example, by using an electronic device.

BACKGROUND

Recently, electronic devices have been developed into various wearable devices such as electronic watches (e.g., smart watches), head-mounted displays (HMDs) (e.g., electronic glasses), electronic shoes, electronic clothes, and electronic tattoos, which can be worn by a user or transplanted into parts of the user's body, as well as hand-held devices, such as tablet computers, smart phones, or the like. The user may simultaneously use (e.g., carry or wear) two or more of the electronic devices mentioned above. In this case, some of the electronic devices, which are used by the user at the same time, may have similar or in some cases identical functions. For example, both a tablet computer and a smart phone may perform multimedia functions, such as a movie player and a music player, as well as communication functions, such as phone calls or text messages. In addition, since the latest electronic devices, such as smart phones, smart watches, electronic glasses and electronic shoes, adopt various sensors, such devices may perform a function of measuring the amount of exercise taken by the user. In some cases, the user may simultaneously use a plurality of electronic devices that perform identical or similar functions to each other, for example, in order to obtain a more accurate result.

SUMMARY

When the user simultaneously uses a plurality of electronic devices that have identical or similar functions to each other, power consumption may increase because the plurality of electronic devices performs the same function which might otherwise be performed by one electronic device. In addition, the user tends to use a plurality of electronic devices that can detect identical or similar information to each other. In this case, each of the plurality of electronic devices detects the corresponding information, so the information detected by the plurality of electronic devices may be different from each other according to the position (e.g., body attachment position) or the status (e.g., power status) thereof. For example, the information detected by one electronic device may be more accurate or inaccurate than the same or similar information detected by the other electronic device. Accordingly, the information detected by a plurality of electronic devices may have incorrect information, so the user may be confused with the information provided by the plurality of electronic devices.

In view of the above, method according to an embodiment of the present disclosure is disclosed, which may include: identifying an application to be executed in a first electronic device communicatively coupled with a plurality of electronic devices, selecting candidate devices from the plurality of electronic devices, the candidate devices having at least one function associated with execution of the application, selecting a second electronic device from among the candidate devices based a factor including at least one of: status information of each of the candidate devices, position information of each of the candidate devices in relation to at least one of a user or the first electronic device, and at least one property of data associated with the at least one function of the candidate devices, and executing the application in the first electronic device utilizing the at least one function of the second electronic device.

In accordance with another embodiment of the disclosure, there is provided a first electronic device including a communication interface adapted to allow communicative coupling with a plurality of electronic devices, and a processor. The processor is configured to identify an application to be executed in the first electronic device, select candidate devices from the plurality of electronic devices having at least one function associated with execution of the application, select a second electronic device from among the candidate devices based a factor including at least one of: status information of each of the candidate devices, position information of each of the candidate devices in relation to at least one of a user or the first electronic device, and at least one property of data associated with the at least one function of the candidate devices, and execute the application in the first electronic device utilizing the at least one function of the second electronic device.

In another aspect of this disclosure, a computer-readable recording medium is disclosed, storing programs for executing identifying an application to be executed in a first electronic device communicatively coupled with a plurality of electronic devices, selecting candidate devices from the plurality of electronic devices, the candidate devices having at least one function associated with execution of the application, selecting a second electronic device from among the candidate devices based a factor including at least one of: status information of each of the candidate devices, position information of each of the candidate devices in relation to at least one of a user or the first electronic device, and at least one property of data associated with the at least one function of the candidate devices, and executing the application in the first electronic device utilizing the at least one function of the second electronic device.

According to a method and an apparatus for controlling electronic devices according to various embodiments of the present disclosure, for example, some electronic devices that can provide data related to applications may be selected from a plurality of electronic devices, and the data related to the applications may be obtained from the selected electronic devices. The remaining electronic devices, which are not selected, may not create (e.g., detection by a sensor) and transmit the data to other electronic devices, or may not perform at least some of the functions of the relevant devices (e.g., sensors), which enables the plurality of electronic devices to decrease in power consumption.

BRIEF DESCRIPTION OF THE DRAWINGS

The present disclosure will be more apparent from the following detailed description in conjunction with the accompanying drawings, in which.

DETAILED DESCRIPTION

Figure 1:
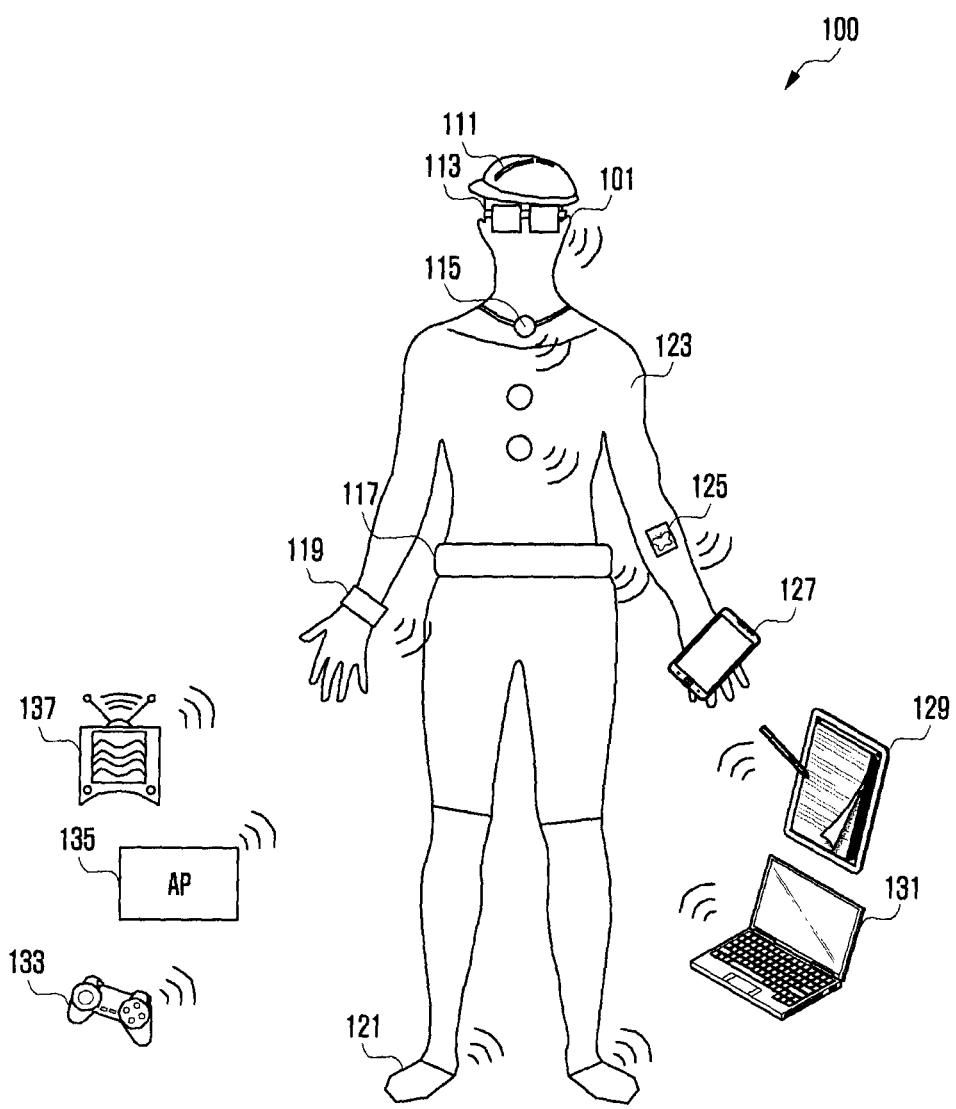
FIG. 1 illustrates a user environment of electronic devices according to various embodiments of the present disclosure.

Example embodiments of the present disclosure are described with reference to the accompanying drawings in detail. Various changes may be made to the disclosure, and the disclosure may have various forms, such that example embodiments will be illustrated in the drawings and described in detail. However, such an embodiment is not intended to limit the disclosure to the disclosed example embodiment and it should be understood that the embodiment include all changes, equivalents, and substitutes within the ambit of the disclosure. Throughout the drawings, like reference numerals refer to like components.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

Hereinafter, a method and an apparatus for controlling a plurality of electronic devices by using a single electronic device according to various embodiments of the present disclosure will be described in detail with reference to FIGS. 1 to 6.

FIG. 1 illustrates a user environment 100 of a plurality of electronic devices according to various embodiments of the present disclosure. As shown in FIG. 1, a user 101 may use (e.g., contact, carry, wear or be transplanted with) a plurality of electronic devices 111 to 137. For example, some of the plurality of electronic devices 111 to 137 may be wearable devices. The wearable devices may be, for example, electronic caps 111, electronic glasses 113 (e.g., HMD), electronic necklaces 115, electronic belts 117, electronic watches (e.g., smart watches) 119, electronic shoes 121, electronic clothes 123, electronic tattoos 125, electronic bracelets (not shown), electronic rings (not shown), or the like. In addition, the plurality of electronic devices 111 to 137 may include devices, such as, for example, mobile phones (e.g., smart phones) 127, tablet PCs 129, laptop PCs 131, game consoles 133, access points (APs) 135 or TVs (e.g., smart TVs) 137, which are able to be connected with or carried by the user 101.

Each of the plurality of electronic devices 111 to 137 may transmit or receive data to or from other electronic devices through wired communication or wireless communication. Alternatively, each of the plurality of electronic devices 111 to 137 may control (e.g., activate or deactivate) at least some functions of other electronic devices.

At least some of the plurality of electronic devices 111 to 137 may execute identical or similar functions to each other. For example, at least some of the electronic cap 111, the electronic glasses 113, the electronic necklace 115, the electronic belt 117, the electronic watch 119, the electronic shoes 121, the electronic clothes 123, the electronic tattoo 125, the mobile phone 127, the tablet PC 129, the laptop PC 131 and the game console 133 may detect information (e.g., walking or running distance, time, speed, calories burned, body temperature, heart rate, or the like) related to the exercise of the user 101.

In this case, each of the plurality of electronic devices 111 to 137 may include at least one component (e.g., displays or sensors) having hardware (e.g., circuit or circuitry), software or a combination thereof, which can provide identical or similar functions. For example, the electronic watch 119 and the electronic shoes 121 may include an acceleration sensor or a gyro-sensor for detecting information related to the exercise of the user 101. According to an embodiment of the present disclosure, both the electronic watch 119 and the electronic shoes 121 may include the acceleration sensor and the gyro-sensor. According to another embodiment of the present disclosure, the electronic watch 119 may include not the gyro-sensor but the acceleration sensor, while the electronic shoes 121 may include not the acceleration sensor but the gyro-sensor, and vice versa.

Figure 2:
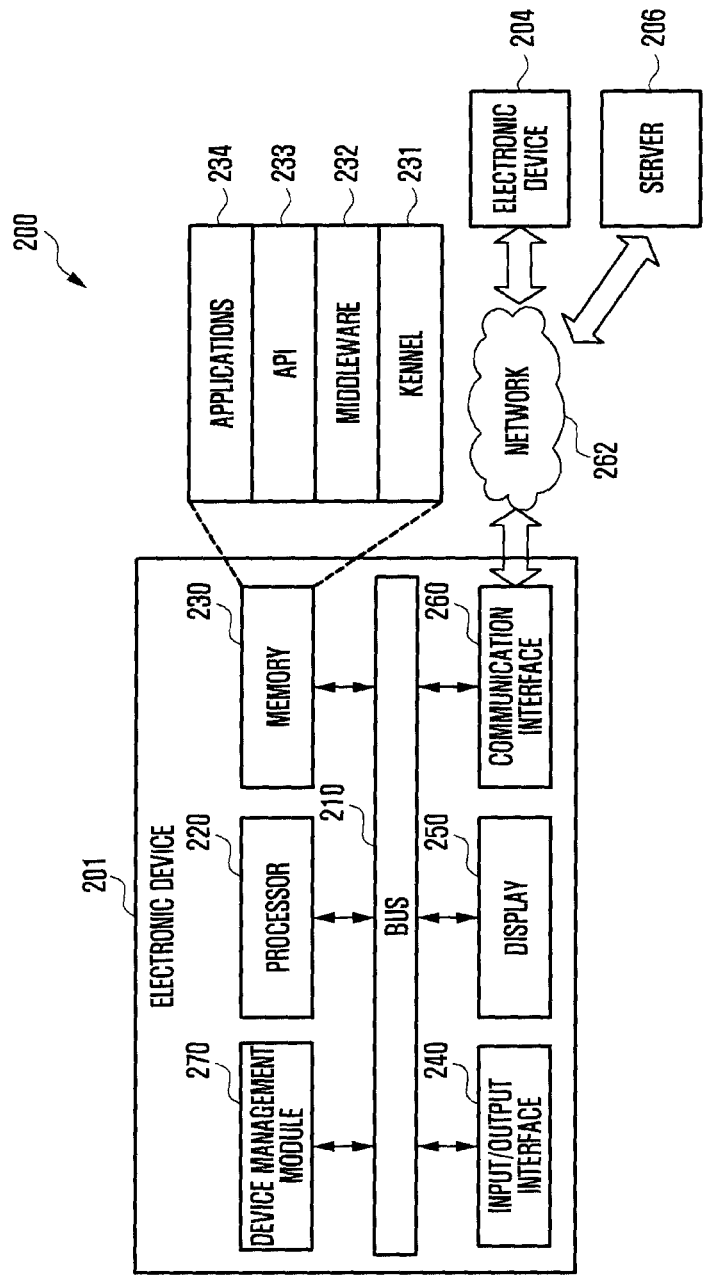
FIG. 2 illustrates a network environment of electronic devices according to various embodiments of the present disclosure.

FIG. 2 is a block diagram illustrating a configuration of an electronic device according to an embodiment of the present disclosure.

Referring to FIG. 2, the electronic device 201 may include a bus 210, a processor 220, a memory 230, input/output interface 240, a display 250, a communication module 260, and a device management module 270.

The bus 210 may be a circuit which interconnects the above-described elements and delivers a communication (e.g., a control message) between the above-described elements.

The processor 220 may receive commands from the above-described other elements (e.g., the memory 230, the input/output interface 240, the display 250, the communication interface 260, the device management module 270 etc.) through the bus 210, may interpret the received commands, and may execute calculation or data processing according to the interpreted commands.

The memory 230 may store commands or data received from the processor 220 or other elements (e.g., the user input module 240, the display module 250, the communication module 260, etc.) or generated by the processor 220 or the other elements. The memory 230 may include programming modules, such as a kernel 231, middleware 132, an Application Programming Interface (API) 233, an application 234, and the like. Each of the above-described programming modules may be implemented in software, firmware, hardware, or a combination of two or more thereof.

The kernel 231 may control or manage system resources (e.g., the bus 210, the processor 220, the memory 230, etc.) used to execute operations or functions implemented by other programming modules (e.g., the middleware 232, the API 233, and the application 234). Also, the kernel 231 may provide an interface capable of accessing and controlling or managing the individual elements of the electronic device 201 by using the middleware 232, the API 233, or the application 234.

The middleware 232 may serve to go between the API 233 or the application 234 and the kernel 231 in such a manner that the API 233 or the application 234 communicates with the kernel 231 and exchanges data therewith. Also, in relation to work requests received from one or more applications 234 and/or the middleware 232, for example, may perform load balancing of the work requests by using a method of assigning a priority, in which system resources (e.g., the bus 210, the processor 220, the memory 230, etc.) of the electronic device 201 can be used, to at least one of the one or more applications 234.

The API 233 is an interface through which the application 234 is capable of controlling a function provided by the kernel 231 or the middleware 232, and may include, for example, at least one interface or function for file control, window control, image processing, character control, or the like.

According to various embodiments, the applications 234 can include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternatively, the application 234 can be an application related to information exchange between the electronic device 201 and an external electronic device. The application related to the information exchange can include, for example, a notification relay application for transmitting specific information to the external electronic device or a device management application for managing the external electronic device.

For example, the notification relay application can include a function of transferring notification information generated in other applications (for example, the SMS/MMS application, the e-mail application, the health care application, or the environmental information application) of the electronic device 201 to an external electronic device (for example, the electronic device 204). Additionally or alternatively, the notification relay application can receive notification information from, for example, an external electronic device (for example, the electronic device 204) and provide the same to a user. The device management application can manage (for example, install, delete, or update), for example, at least some functions (for example, turning on or off an external electronic device (or some elements) or adjusting the brightness (or resolution) of a display) of an external electronic device that communicates with the electronic device 201, an application executed in the external electronic device, or a service (for example, a phone call service or a message service) provided in the external electronic device.

According to various embodiments, the application 234 can include an application designated based on attributes (for example, a type of the electronic device) of the external electronic device. For example, in a case where the external electronic device is an MP3 player, the application 234 can include an application related to reproduction of music. Similarly, in a case where the external electronic device is a mobile medical appliance, the application 234 can include an application related to health care. According to an embodiment, the application 234 can include at least one of an application designated to the electronic device 201 or an application received from the external electronic device (for example, a server 206, the electronic device 204).

The input/output interface 240 can transfer instructions or data input from a user through an input/output device (for example, a sensor, a keyboard, or a touch screen) to, for example, the processor 220, the memory 230, or the communication interface 260 through the bus 210. For example, the input/output interface 240 can provide the processor 220 with data on a user's touch input through the touch screen. Further, through the input/output device (for example, a speaker or a display), the input/output interface 240 can output instructions or data received from the processor 220, the memory 230, or the communication interface 260 through the bus 210. For example, the input/output interface 240 can output voice data processed through the processor 220 to a user through a speaker.

The communication interface 260 can connect communication between the electronic device 201 and an external electronic device. For example, the communication interface 260 can support network communication 262 (for example, Internet, Local Area Network (LAN), Wide Area Network (WAN), telecommunication network, cellular network, satellite network, or Plain Old Telephone Service (POTS)), short-range communication 264 (for example, WiFi™, BluetTooth (BT™), or Near Field Communication (NFC)), or wired communication (for example, Universal Serial Bus (USB), High Definition Multimedia Interface (HDMI), Recommended Standard (RS)-232, or POTS).

The device management module 270 may process at least some pieces of information obtained from other elements (e.g., the processor 220, the memory 230, the input/output interface 240, the communication interface 260, or the like) and provide the same to the user in various ways. For example, the device management module 270 may control at least some functions of the electronic device 201 or the other electronic device (e.g., electronic device 204 or server 206) in order to allow the electronic device 201 to interwork with the other electronic device, by using or independently of the processor 220. According to an embodiment of the present disclosure, the other electronic device (e.g., electronic device 204 or server 206) may be at least one of the electronic devices 111 to 137 of FIG. 1, and may include the identical or similar elements (e.g., device management module 270) to the electronic device 201.

According to various embodiments of the present disclosure, the device management module 270 may select at least one of the plurality of electronic devices that are related to applications executed by the electronic device 201. The applications may be executed by using the selected device (e.g., input/output devices or sensors of the selected device). The device management module 270 is illustrated in more detail in FIGS. 3 to 4b.

Figure 3A:
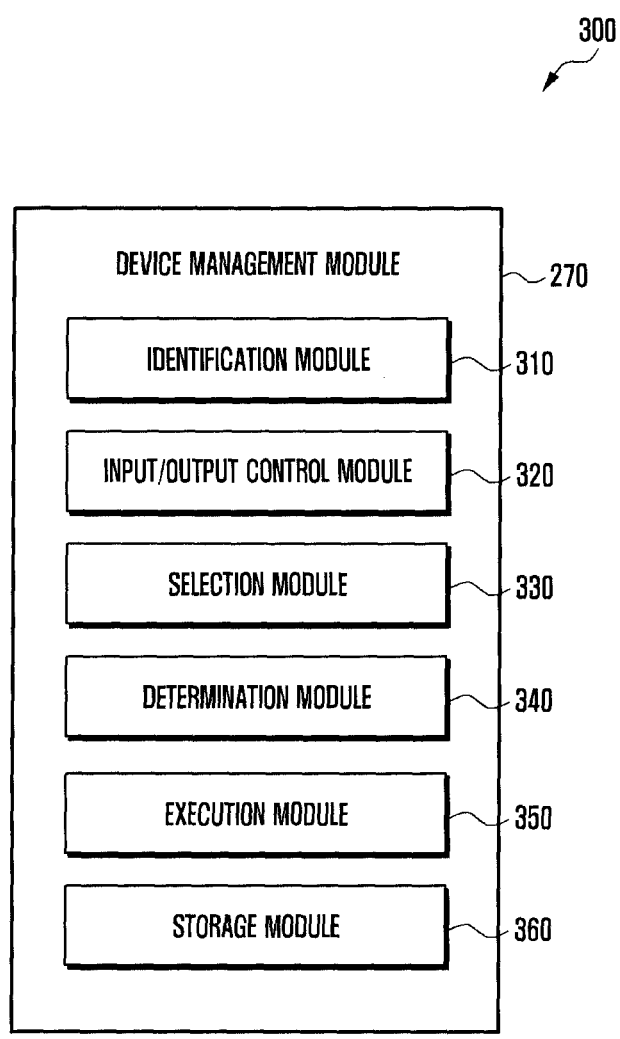
FIG. 3a is a block diagram illustrating a device management module for controlling electronic devices according to various embodiments of the present disclosure.

FIG. 3a is a block diagram 300 of the device management module 270 by which an electronic device (e.g., electronic device 201) controls other electronic devices (e.g., electronic device 204 or server 206) according to various embodiments of the present disclosure. Referring to FIG. 3a, the device management module 270 may include an identification module 310, an input/output control module 320, a selection module 330, a determination module 340, an execution module 350 and a storage module 360. The identification module 310 may identify (e.g., recognize or determine) applications (e.g., applications 234) that can be used (e.g., that are being executed or that can be executed) in the electronic device (e.g., electronic device 201). For example, according to an embodiment of the present disclosure, the identification module 310 may identify applications, such as a healthcare application, a music playing application, a voice recognition application, a position recognition application or a phone call application, which are able to be executed by the electronic device.

According to an embodiment of the present disclosure, the input/output control module 320 may activate input devices or sensors that are functionally connected with the electronic device that can obtain data available to the applications. Further, the input/output control module 320 may obtain the data available to the applications through the input device or the sensors that are functionally connected with the electronic device. For instance, when the electronic device (e.g., identification module 310) recognizes that the healthcare application is to be executed, the input/output control module 320 may obtain data for calculating the amount of the user's exercise (e.g., data such as a running distance, speed or a heart rate) through the sensors (e.g., acceleration sensor or gyro-sensor) that are functionally connected with the electronic device (e.g., electronic device 201). Likewise, when the position recognition application of the user (or the corresponding electronic device) is executed in the electronic device, the input/output control module 320 may activate a GPS that is functionally connected with the electronic device and obtain position data for recognizing the position of the user (or the corresponding electronic device) through the GPS.

The input/output control module 320 may activate input devices or the sensors that are functionally connected with other electronic devices (e.g., electronic device 204) that communicate with the electronic device (e.g., electronic device 201) in order to, for example, obtain data available to the applications (e.g., execution of applications). In addition, the input/output control module 320 may obtain the data available to the applications through input devices or sensors that are functionally connected with other electronic devices. For instance, when the electronic device (e.g., identification module 310) identifies that the voice recognition application is to be executed, the input/output control module 320 may obtain voice data for voice recognition through an input device (e.g., microphones) that is provided in the other electronic device that communicates with the electronic device.

The input/output control module 320, for example, may activate output devices that are functionally connected with an electronic device for outputting data related to (e.g., available to) the applications to be executed in the electronic device (e.g., electronic device 201). In addition, the input/output control module 320 may output the data related to the applications through input devices that are functionally connected with the electronic device. For example, when the electronic device (e.g., identification module 310) identifies that the music playing application is to be executed, the input/output control module 320 may output music data through an output device (e.g., speakers) that is functionally connected with the electronic device (e.g., electronic device 201).

The input/output control module 320 may activate output devices that are functionally connected with other electronic devices (e.g., electronic device 204) that communicate with the electronic device (e.g., electronic device 201), for example, in order to output the data available to the applications. In addition, the input/output control module 320 may output data available to the applications through an output device that is functionally connected with the other devices. Likewise, when the electronic device (e.g., identification module 310) identifies that the movie playing application is to be executed, the input/output control module 320 may output image data through output devices (e.g., displays) that are provided in the other electronic device that communicates with the electronic device.

According to an embodiment of the present disclosure, the input/output control module 320 may control various hardware devices that are functionally connected with the electronic device or other devices that communicate with the electronic device, in obtaining or outputting the data related to (e.g., available to) the applications to be executed by the electronic device (e.g., electronic device 201). For instance, the input/output control module 320 may control at least one of input devices (e.g., camera, microphone or touch panel) for obtaining information from the user, output devices (e.g., speaker or display) for providing information to the user, communication modules (e.g., WiFi, BT, GPS or NFC) for receiving information from external devices (e.g., other electronic devices), or sensors (e.g., acceleration sensor, gyro-sensor or proximity illuminance sensor) for obtaining user information or status information related to the electronic device. According to an embodiment of the present disclosure, the input/output devices or the sensors that are functionally connected with the electronic device may be provided inside or outside the electronic device or other electronic devices, to be thereby used to execute functions of the applications in the electronic device.

The selection module 330 may select at least one or more devices (hereinafter, referred to as candidate devices) that are able to provide at least some functions necessary for the execution of the applications selected in the electronic device (e.g., electronic device 201). The candidate devices may be the devices that are preliminary selected, for example, in order to select the electronic devices (hereinafter, referred to as target devices) that directly execute at least some functions of the applications. The at least some functions may include, for example, a function for obtaining data available to the execution of the applications, or a function for outputting data created by the applications. The candidate devices may include, for example, electronic devices that have input devices (e.g., microphone or camera) or sensors for obtaining the data available to some functions of the applications, or electronic devices that have output devices (e.g., speaker or display) for providing the data executed by the applications to the user.

According to an embodiment of the present disclosure, the selection module 330 may obtain information (hereinafter, referred to as support information) on whether at least some functions of the applications to be executed in the electronic device (e.g., electronic device 201) can be supported (e.g., at least some functions of the applications can be directly executed, such as outputting voice data, or data available for the execution of at least some functions of the applications can be obtained) from a plurality of electronic devices related to the user of the electronic device, and may select the candidate device(s) from the plurality of electronic devices by using the support information. For example, the selection module 330 may obtain the support information corresponding to the electronic device (e.g., electronic device 201) or the external devices (e.g., electronic device 204) of the electronic device from the internal elements (e.g., memory 230) of the electronic device. In addition, the selection module 330 may obtain (e.g., receive) the support information corresponding to the external devices from the external devices.

The support information may be dynamically changed by at least one of an addition of new external devices that are functionally connected with the electronic device (e.g., electronic device 201), a status change related to typical external devices, a status change of the electronic device, selected functions of the applications, or a usage pattern of the applications. The status of the electronic device or the external devices may include, for example, the physical location of the corresponding device (e.g., the location of the corresponding device positioned by a GPS), the relative position with respect to the other device that interworks with the corresponding device (e.g., the distance between the corresponding device and the other device), user's body parts where the devices are attached, a power percentage, or the like.

For example, referring to FIG. 1, when the healthcare application is measuring the amount of exercise of the user 101 in the mobile phone 127, acceleration data may be utilized for measurement of the amount of exercise. The mobile phone 127 may receive, for example, the support information on whether the acceleration data can be provided from the plurality of electronic devices 111 to 137. Based on the support information, when it is determined that the electronic belt 117, the electronic watch 119, the electronic shoes 121, the electronic clothes 123, the electronic tattoo 125 and the mobile phone 127 among the plurality of electronic devices 111 to 137 related to the user 101 include the acceleration sensor for obtaining the acceleration data, the selection module (e.g., selection module 330) corresponding to the mobile phone 127 may select at least one of the electronic devices 117, 119, 121, 123, 125 or 127 as the candidate device(s).

In another embodiment, when the application for recognizing the user's voice is executed in the mobile phone 127, user's voice data may be utilized. When, for example, the electronic glasses 113, the electronic necklace 115, the electronic watch 119 and the mobile phone 127 among the plurality of electronic devices 111 to 137 related to the user 101 include the microphone for obtaining the voice data, the selection module (e.g., selection module 330) corresponding to the mobile phone 127 may select at least one of the electronic devices 113, 115, 119 or 127 as the candidate device(s).

In another embodiment, when the music playing application is executed in the mobile phone 127, the device (e.g., speaker) for outputting the music data may be utilized. For example, when the electronic cap 111, the electronic glasses 113, the electronic necklace 115, the electronic watch 119, the mobile phone 127, the tablet PC 129, the laptop PC 131 and the TV 137 among the plurality of electronic devices 111 to 137 related to the user 101 include the speaker for outputting the music data, the selection module (e.g., selection module 330) corresponding to the mobile phone 127 may select at least one of the electronic devices 111, 113, 115, 119, 127, 129, 131 or 137 as the candidate device(s).

According to an embodiment of the present disclosure, the candidate device(s) may include at least one of the electronic device (e.g., electronic device 201) or the external devices (e.g., electronic device 204 or server 206) that communicate with the electronic device (e.g., by using a network 262). The electronic device may communicate with the external devices by using short-range communication, and the short-range communication may include the communication that covers a predetermined distance (e.g., 10 m) from the user corresponding to the electronic device (or the electronic device). According to an embodiment of the present disclosure, the candidate device(s) may include the devices that the user of the electronic device carries or wears on his/her body among the electronic device or the external devices of the electronic device.

The determination module 340 may determine at least one device (e.g., target devices) that directly executes at least some functions of the applications identified by the identification module 310 from the candidate device(s) which are selected by using the selection module 330. For instance, the determination module 340 may determine the target devices by using at least one piece of information among status information (e.g., data load, power consumption, or battery percentage, or the like) of the candidate devices, position information thereof on the user's body (e.g., arms, feet or a head), or data (or properties of data) corresponding to at least some functions of the applications, which is obtained from the candidate device(s).

According to an embodiment of the present disclosure, the determination module 340 may select at least one piece of information for determining the target devices, based on the functions of the applications with the status information and the position information of the candidate devices or the data (or properties of data) obtained from the candidate device(s). For example, when the application (e.g., movie playing application), which utilizes high power consumption, is executed (or is to be executed) in the electronic device, the determination module 340 may use the status information (e.g., information of battery percentage) of each candidate device as the information for selecting the target device(s) among the candidate device(s).

For another example, when the application influenced by the position with respect to the user's body is executed in the electronic device (e.g., electronic device 201), the determination module 340 may use the position information of each candidate device in order to determine the target device from the candidate device(s). The applications influenced by the position may be, for example, the music playing application for reproducing music toward the user's ears or the voice recognition application for taking a voice from the user's mouth.

For another example, when the application influenced by the data (or data pattern) is executed in the electronic device (e.g., electronic device 201), the determination module 340 may determine the target device(s) by using the data (or data pattern) obtained from the candidate device(s). The applications influenced by the data may be, for example, the healthcare application for creating information on the amount of exercise by using the acceleration data obtained from the candidate device(s) or the voice recognition application for providing text messages corresponding to voice data to the user by using the voice data obtained from the candidate device(s).

According to an embodiment of the present disclosure, the determination module 340 may identify at least one of the status information and the position information of the candidate devices, or the data obtained from the candidate devices, and may determine the target device based on the identified result. Additionally or alternatively, the electronic device 201 may obtain at least one piece of information from the candidate device(s) (e.g., electronic device 201, electronic device 204 or server 206) or the internal elements (e.g., memory 230) of the electronic device.

For example, referring to FIG. 1, the determination module 340 corresponding to the mobile phone 127 (e.g., electronic device 201) may identify the status information (e.g., information of battery percentage) on the candidate devices, such as the electronic glasses 113, the mobile phone 127 and the tablet PC 129. If the battery percentage (e.g., 70% of the full capacity or 1,000 mAh) of the PC 129 is more than a predetermined level (e.g., 10% of the full capacity or 150 mAh) and the battery percentages (e.g., 3% of the full capacity or 50 mAh) of the electronic glasses 113 and the mobile phone 127 are less than the predetermined level, the determination module 340 may determine the tablet PC 129 that has the maximum battery percentage as the target device, based on the status information on the candidate devices 113, 127 and 129.

For another example, when the music playing application is executed in the mobile phone 127, the determination module 340 corresponding to the mobile phone 127 may identify the positions of the candidate devices, i.e., the electronic glasses 113, the electronic watch 119 and the mobile phone 127 with respect to the user 101. If the electronic glasses 113 are positioned on the head, the electronic watch 119 is positioned on the arm, and the mobile phone 127 is positioned on the hand, the determination module 340 may determine the electronic glasses 113 that are closest to the user's ears as the target device, based on the position information of the candidate devices 113, 127 and 129.

Figure 3B:
FIG. 3b illustrates data corresponding to applications according to various embodiments of the present disclosure.
Figure 3B:
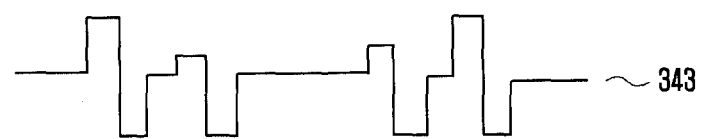
Figure 3B:
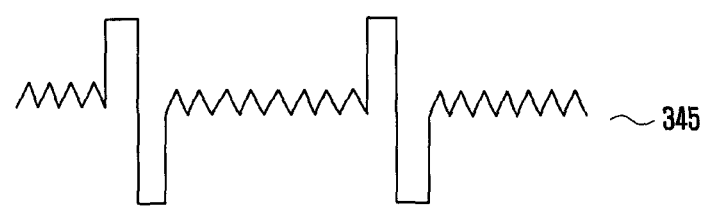
Figure 3B:
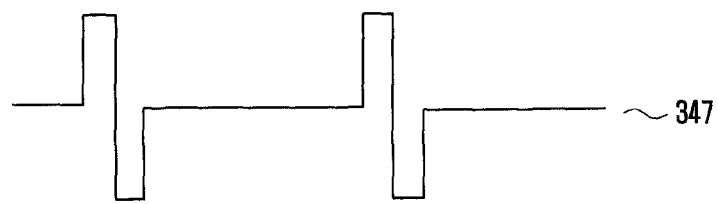

Hereinafter, the determination module 340 according to various embodiments of the present disclosure will be described with reference to FIG. 3b. FIG. 3b illustrates an example of waves of data that the electronic device obtains from other electronic devices according to various embodiments of the present disclosure. According to an embodiment of the present disclosure, the determination module 340 may compare signals (e.g., the amplitude of signal or noise levels) between data obtained from the candidate devices, for example, by using the input/output control module 320 in order to determine the target device(s). Further, based on the result of the comparison, the determination module 340 may determine the target device that is to directly execute at least some functions of the applications to be executed in the electronic device from the candidate devices.

For example, when the application for measuring the amount of exercise is executed in the mobile phone 127, the selection module (e.g., selection module 330) corresponding to the mobile phone 127 may select the electronic glasses 113, the electronic watch 119 and the electronic shoes 121 as the candidate devices, based on the support information on whether the acceleration data can be provided. According to an embodiment of the present disclosure, the determination module (e.g., determination module 340) corresponding to the mobile phone 127 may control the input/output control module (e.g., input/output control module 320) corresponding to the mobile phone 127 to obtain exercise data 341 from the electronic glasses 113, exercise data 343 from the electronic watch 119, and exercise data 345 from the electronic shoes 121, respectively. According to an embodiment of the present disclosure, when the input/output control module 320 obtains the exercise data 341, 343 and 345 from the electronic glasses 113, the electronic watch 119 and the electronic shoes 121, respectively, the determination module 340 may control, for example, the input/output control module 320 to continue to obtain the exercise data 341, 343 and 345 from the electronic glasses 113, the electronic watch 119 and the electronic shoes.

The determination module 340 corresponding to the mobile phone 127 may compare, for example, the amplitude of signals of the exercise data 341, 343 and 345 measured by the candidate devices 113, 119 and 121, respectively. If the amplitude of signal of the exercise data 345 measured by the electronic shoes 121 is greatest among the exercise data 314, 343 and 345 measured by the candidate devices 113, 119 and 121, the determination module 340 may determine the electronic shoes 121 as the target device, based on the amplitude of signals of the exercise data 341, 343 and 345.

According to an embodiment of the present disclosure, the determination module 340 corresponding to the mobile phone 127 may compare, for example, the noise levels (e.g., signal to noise ratio or "SNR") of the exercise data 341, 343 and 345 measured by the candidate devices 113, 119 and 121, respectively. If the noise level of the exercise data 345 measured by the electronic shoes 121 is smallest among the exercise data 314, 343 and 345 measured by the candidate devices 113, 119 and 121, the determination module 340 may determine the electronic shoes 121 as the target device, based on the noise levels of the exercise data 341, 343 and 345.

According to an embodiment of the present disclosure, the determination module 340 may compare the data patterns measured by the candidate devices with the data pattern 347 specified based on the properties (e.g., the type of application or data utilized for execution of applications) of the applications. For example, in the case of the application for measuring the amount of exercise, the specified data pattern 347 may include an acceleration data pattern corresponding to walking. Further, in the case of the application for recognizing gestures, the specified data pattern 347 may include a gyro-data pattern corresponding to the gestures (e.g., waving hands or shaking a head).

For example, the determination module (e.g., determination module 340) corresponding to the mobile phone 127 may compare the exercise data 341, 343 and 345 measured by the candidate devices, i.e., the electronic glasses 113, the electronic watch 119 and the electronic shoes 121 with the data pattern 347 specified in the application for measuring the amount of exercise. If the exercise data 345 corresponding to the electronic shoes 121 is identical or most similar to the specified data pattern 347, the determination module 340 may determine the electronic shoes 121 as the target device, based on the comparison result of the data patterns.

According to an embodiment of the present disclosure, the determination module 340 may give priority to the candidate devices, based on at least one of the status (e.g., battery capacity or processing capacity) designated in the applications that are executed (or are to be executed) in the electronic device (e.g., electronic device 201), the position (e.g., arms, legs or feet) or the properties of data (e.g., amplitude of signal, noise level or data pattern) in order to select the target device from the candidate devices. For example, the determination module 340 may determine the target devices in order from highest priority to lowest priority. For example, in the case of the movie playing application that utilizes relatively high power consumption of the battery, the determination module 340 may give higher priority to the device having the first degree of battery percentage (e.g., about 90%) than the device having a second degree of battery percentage (e.g., about 50%) among the candidate devices.

For another example, in the case of the application for measuring the amount of exercise (e.g., measuring walking), the determination module 340 may give the higher priority to the device that is positioned on the user's legs than the device that is positioned on the user's eyes because the legs better reflect and track the user's exercise relative to the eyes. Likewise, for example, in the case of the voice recognition application in which the voice data obtained from the candidate device(s) is of great importance, compared to other applications, the determination module 340 may give priority to the candidate devices in order from the high amplitude of the voice signal to the low amplitude of the voice signal. The electronic device (e.g., determination module 340) may pre-store the priority given to the candidate devices (e.g., electronic device 201, electronic device 204 or server 206) according to the applications, for example, in the memory 230, for example, by using the storage module 360. According to an embodiment of the present disclosure, the determination module 340 may determine the target device(s) based on the priority given to the candidate device(s). For example, the determination module 340 may determine the device that has the priority in a specified range (e.g., predetermined range) among the candidate device(s) as the target devices.

The execution module 350 may control (e.g., activate) the target device(s) to execute the applications by using at least some functions of the target devices. For example, according to an embodiment of the present disclosure, the execution module 350 may activate the input/output device or at least one sensor (e.g., acceleration sensor) of the target device(s) corresponding to at least some functions available to the execution of the applications (e.g., the function of obtaining the acceleration data that is available to the execution of the application for measuring the amount of exercise), for example, by using the input/output control module 320.

Further, according to an embodiment of the present disclosure, when the input/output device or at least one sensor of the target device(s) corresponding to at least some functions available to the execution of the applications, for example, has been activated, the execution module 350 may maintain the activation status in order to obtain or output the data (e.g., acceleration data). For example, in a case in which the determination module 340 uses the data (or the properties of data) corresponding to at least some functions of the applications in order to select the target device(s), the input/output device or at least one sensor of the target device(s) may be in the activated status.

According to an embodiment of the present disclosure, the execution module 350 may deactivate at least some functions (e.g., input/output devices or at least one sensor corresponding to the function of obtaining the acceleration data) of the electronic devices except for the target device(s) among the candidate device(s), for example, by using the input/output control module 320. For example, referring to FIG. 1, when the application for measuring the amount of exercise is executed in the mobile phone 127, the execution module (e.g., execution module 350) corresponding to the mobile phone 127 may activate at least some functions of the electronic shoes 121 (or the devices corresponding to the at least some functions) (e.g., exercise measuring modules, such as an acceleration sensor or gyro-sensor, that are locally connected with the electronic shoes 121) so that the target device, i.e., the electronic shoes 121 may measure the amount of exercise. In addition, the execution module 350 may obtain the exercise data measured by the electronic shoes 121 from the same.

For example, when all the candidate devices, i.e., the electronic glasses 113, the mobile phone 127 and the electronic shoes 121 measure the exercise data, the execution module 350 may deactivate at least some functions (or devices corresponding to the at least some functions) (e.g., exercise measuring module, such as an acceleration sensor or gyro-sensor, that are locally connected with the electronic glasses 113 and the mobile phone 127 of the devices (e.g., the electronic glasses 113 and the mobile phone 127) except for the target device among the candidate devices, in order to prevent the devices except for the target device from measuring the exercise data. In addition, the execution module 350 may maintain the activation of an exercise measuring module included in the electronic shoes 121 so that the electronic shoes 121 may measure the amount of exercise through the exercise measuring module.

For another example, when the music playing application is executed (or is to be executed) in the tablet PC 129, the execution module (e.g., execution module 350) corresponding to the tablet PC 129 may activate the target device, i.e., the electronic glasses 113 (or speakers that are locally connected with the electronic glasses 113) to thereby reproduce music.

In addition, the execution module 350 may use the data obtained from the target device(s) to execute the application selected by the identification module 310. For example, when the identification module 310 identifies the user's status (e.g., gestures) or the application that determines the position information of at least one device among the target devices, the execution module 350 may obtain data (e.g., acceleration or gyro data) corresponding to the application from the target device(s) and provide the user's status information or the position information created by using the obtained data to the application.

For example, the application for correcting an exercise motion of the user 101 through recognition of user's gestures (or motion) may be executed in the tablet PC 129 (electronic device 201). In this case, the execution module (e.g., execution module 350) corresponding to the tablet PC 129 may recognize the motion of the user 101 based on motion data (e.g., acceleration or gyro-data) obtained from the target devices, i.e., the electronic glasses 113, the electronic watch 119 and the electronic shoes 121. For example, the execution module 350 may recognize that the user 101 turns his face to the right by using the motion data obtained from the electronic glasses 113 on his head. Further, the execution module 350 may recognize that the user 101 raises his left arm by using the motion data obtained from the electronic watch 119 on his arm.

Furthermore, the execution module 350 may recognize that the user 101 raises his right foot by using the motion data obtained from the electronic shoes 121 on his foot. In addition, the execution module 350 may recognize overall gestures (a gesture by which the user turns his face to the right and raises his left arm and right foot) of the user 101 by using the recognized motion status of the user 101. The execution module may provide exercise motion data of the user 101 to the application by using the recognized gestures. The application may provide correct information on the exercise motion to the user 101 based on the user's exercise motion.

For example, when the application for determining the position of the device with respect to the user 101 is executed in the mobile phone 127 (e.g., electronic device 201), the execution module (e.g., execution module 350) corresponding to the mobile phone 127 may obtain movement data of the target device, i.e., the electronic watch 119 from the electronic watch 119, for example, through the input/output control module 320. In addition, the execution module may obtain the movement data of the mobile phone 127 from a movement detecting module that is locally connected with the mobile phone 127. The execution module may compare the obtained movement data of the mobile phone 127 with the movement data of the electronic watch 119. Based on the result of the comparison, if the difference between two pieces of data does not exceed a predetermined range, the execution module may determine that the mobile phone 127 is positioned on the "arm" by using the position information of the electronic watch 119, i.e., "arm". Further, the execution module may provide the position information of the mobile phone 127, i.e., "arm", to the position determining application to thereby use the same.

In addition, based on the result of the comparison, if the difference between two pieces of data exceeds the predetermined range, the execution module may recognize that the mobile phone 127 is not positioned on the "arm". In this case, additionally or alternatively, according to an embodiment of the present disclosure, in order to find the position of the mobile phone 127, the determination module (e.g., determination module 340) corresponding to the mobile phone 127 may determine the device (e.g., electronic shoes 121) at another position as the target device. The application for determining the position of the device with respect to the user (e.g., user 101) may determine, for example, the position of the device (e.g., tablet PC 129) other than the device (e.g., mobile phone 127) that executes the application.

The storage module 360 may store information for the operation of the selection module 330 or the determination module 340. According to an embodiment of the present disclosure, the storage module 360 may store the support information corresponding to at least one of the electronic device (e.g., electronic device 201) and the external devices (e.g., electronic device 204) that communicate with the electronic device. The storage module 360 may provide the stored support information to the selection module 330 to thereby select the candidate device(s).

According to an embodiment of the present disclosure, the storage module 360 may store the status information and the position information of the candidate device(s), or data (or the properties of data) corresponding to the functions of the applications to be executed in the electronic device. In addition, the storage module 360 may store the data pattern (e.g., acceleration data pattern corresponding to walking in the case of the exercise measuring application) that is designated according to the applications. The storage module 360 may provide the stored status information, the position information, the data (or the properties of data) or the designated data pattern to the determination module 340 to thereby select the target device(s).

According to various embodiments of the present disclosure, an electronic device (e.g., mobile phone 127 or electronic device 201) for controlling electronic devices in proximity may include an identification module (e.g., identification module 310) that identifies an application (e.g., healthcare application) to be executed in the electronic device, a selection module (e.g., selection module 330) that selects a plurality of electronic devices (e.g., electronic shoes 121 or mobile phone 127) in proximity to the electronic device, which are able to provide at least some functions (e.g., function of obtaining acceleration data) available to the application, among the electronic device and one or more devices (e.g., electronic devices 111 to 137), a determination module (e.g., determination module 340) that determines at least one device (e.g., electronic shoes 121) among the plurality of electronic devices, based on at least one of status information (e.g., data load, power consumption (battery percentage), or the like} and position information (e.g., arm, foot or head) of the plurality of electronic devices or the properties (e.g., pattern, amplitude or noise level of signal) of the data (e.g., acceleration data or sound data) corresponding to the functions, and an execution module (e.g., execution module 350) that executes the application by using at least some functions of the at least one electronic device.

According to various embodiments of the present disclosure, at least some of the plurality of electronic devices may be devices that are worn or attached on body parts of the user (e.g., the user 101) corresponding to the electronic device.

According to various embodiments of the present disclosure, the selection module may identify at least one device in the range of a specified distance from the user (e.g., the user 101) corresponding to the electronic device.

According to various embodiments of the present disclosure, the determination module may obtain the position information (e.g., "legs" or "hands") from the plurality of electronic devices (e.g., electronic shoes 121 or mobile phone 127) and determine a device that is positioned on the user's body part (e.g., "legs") corresponding to the application as the at least one device (e.g., electronic shoes 121).

According to various embodiments of the present disclosure, the determination module may obtain the data (e.g., acceleration data) from each of the plurality of electronic devices and determine the at least one electronic device, based on the amplitude or the noise level of signal among the properties of data.

According to various embodiments of the present disclosure, the determination module may obtain the data (e.g., acceleration data) from each of the plurality of electronic devices and determine the at least one electronic device, based on the result of comparing the pattern in the properties of data with the data pattern designated in the application. For example, based on the result of the comparison, the determination module may determine at least one electronic device corresponding to the designated data pattern of the data according to the determination that the data pattern corresponds to the designated data pattern.

According to various embodiments of the present disclosure, the determination module may compare the status information and the position information of the plurality of electronic devices or the properties of data with the corresponding information of the status information, the position information or the properties of data which are designated in the application, and may give priority to the plurality of electronic devices or the status information, the position information or the properties of data which correspond to the plurality of electronic devices, based on the comparison result. Then, the determination module may determine the at least one electronic device according to the priority.

According to various embodiments of the present disclosure, the execution module may obtain the data (e.g., acceleration data) from the at least one electronic device (e.g., electronic shoes 121) and execute the application (e.g., healthcare application) by using the data.

According to various embodiments of the present disclosure, the execution module may activate (e.g., turn on or operate) input/output devices or at least one sensor (e.g., acceleration sensor), which are functionally connected with the at least one electronic device (e.g., electronic shoes 121) and related to the function (e.g., function for obtaining the acceleration data), and may deactivate (e.g., turn off or stop) input/output devices or at least one sensor module (e.g., acceleration sensor), which are functionally connected with the devices (e.g., mobile phone 127) except for the at least one electronic device among the plurality of electronic devices (e.g., electronic shoes 121 or mobile phone 127) and related to the function.

According to various embodiments of the present disclosure, the execution module may obtain the data (e.g., acceleration data or gyro-data) from the at least one electronic device and determine the user's gesture (e.g., gestures of waving hands or running) with respect to the at least one electronic device, based on the data.

According to various embodiments of the present disclosure, the determination module may obtain the position information (e.g., legs) corresponding to the at least one electronic device (e.g., electronic shoes 121), and the execution module may determine the position of the electronic device (e.g., mobile phone 127) or the position (e.g., legs) of the external device with respect to the electronic device (e.g., electronic belt 117), which is within a predetermined distance from the at least one electronic device, by using the position information corresponding to the at least one electronic device.

According to various embodiments of the present disclosure, the determination module may obtain the first data from the at least one electronic device (e.g., acceleration data obtained from the at least one electronic device) and obtain the second data from the electronic device or the external device (e.g., acceleration data obtained from the electronic device or the external device). Also, the execution module may compare the signal pattern corresponding to the first data with the signal pattern corresponding to the second data, to thereby determine whether the difference between the signal patterns of the first data and the second data exceeds a specified range. According to an embodiment of the present disclosure, if the difference between the signal patterns does not exceed the specified range, the execution module may determine the position of the electronic device or the position of the external device.

According to various embodiments of the present disclosure, in the case of the electronic device that is included in the at least one electronic device (e.g., the case in which the electronic device is the at least one electronic device), the execution module may obtain the data from a memory (e.g., memory 230) that is locally connected with the electronic device, and may execute the application by using the data.

According to various embodiments of the present disclosure, the determination module may select one device (e.g., selection device or electronic glasses 113) from the plurality of electronic devices (e.g., electronic glasses 113, electronic shoes 121 or mobile phone 127) and determine the at least one electronic device (e.g., electronic shoes 121) by using the one device. For example, the determination module may determine the at least one electronic device, based on that the one device selects the at least one electronic device.

According to various embodiments of the present disclosure, the execution module may obtain the data (e.g., acceleration data) through the one device (e.g., electronic glasses 113) and execute the application (e.g., healthcare application) by using the data.

Figure 4A:
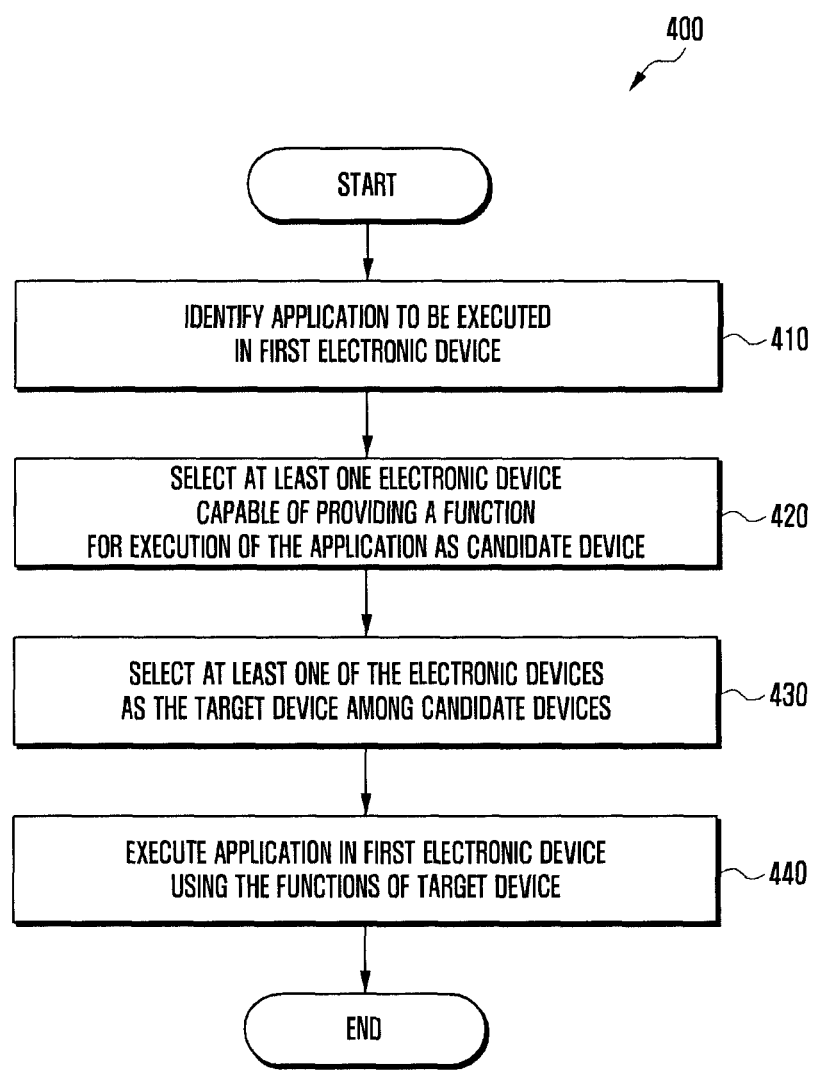
FIG. 4a is a flowchart illustrating a method by which an electronic device controls one or more electronic devices that communicate with the electronic device according to various embodiments of the present disclosure.

FIG. 4a is a flowchart 400 illustrating a method by which an electronic device (e.g., electronic device 201) controls one or more electronic devices that communicate with the electronic device according to various embodiments of the present disclosure. In operation 410, the electronic device (e.g., identification module 310) may identify the application (e.g., application for measuring the amount of exercise of the user 101) to be executed in the electronic device (e.g., mobile phone 127). In operation 420, the electronic device (e.g., selection module 330) may select a plurality of electronic devices (e.g., mobile phone 127, electronic cap 111, electronic watch 119 or electronic shoes 121), which are able to provide at least some functions (e.g., function of obtaining or outputting data to execute the application) available, helpful or desirable in execution of the application on the electronic device. These selected plurality of electronic devices may also be referred to as the candidate devices.

In operation 430, the electronic device (e.g., determination module 340) may select at least one electronic device (e.g., electronic watch 119 or electronic shoes 121) as the target device, based on at least one of the status information and the position information of the candidate devices or the properties of the data generated by the respective candidate devices with reference to at least some functions of the application. In operation 440, the electronic (e.g., execution module 350) may execute the application (e.g., application for measuring the amount of exercise of the user 101) which involves utilization of at least some functions of the target device.

Additionally or alternatively, according to an embodiment of the present disclosure, the electronic device (e.g., mobile phone 127) may select at least one device (e.g., electronic watch 119) (hereinafter, referred to as a "selection device") from the candidate devices in operation 430. The electronic device may control the selection device to select the target device. For example, referring to FIG. 1, the healthcare application for measuring the amount of exercise may be executed in the mobile phone 127, and the electronic cap 111 and the electronic watch 119 may be selected as the candidate devices to measure the exercise data. If the mobile phone 127 is not able to measure the exercise data, the mobile phone 127 may select the electronic watch 119 as the selection device and control the electronic watch 119 to obtain the exercise data from the electronic cap 111.

In addition, the mobile phone 127 may control the electronic watch 119 to select the target device by using the exercise data obtained from the electronic cap 111 and the exercise data measured by the electronic watch 119. The electronic watch 119 (e.g., determination module corresponding to the electronic watch 119) may select the target device, for example, in the manner identical or similar to the method by which the target device is selected in the determination module 340 corresponding to the mobile phone 127. For example, the electronic watch 119 may select the device according to consideration of the exercise data where the amplitude of the signal is greatest or the noise level of the signal is lowest, as detected among exercise data obtained from the electronic cap 111 or measured by the electronic watch 119. Additionally or alternatively, the electronic watch 119 may provide the information (e.g., name, ID or identification number of the device) on the selected target device to the mobile phone 127.

When the electronic watch 119 selects the electronic cap 111 as the target device, the mobile phone 127 may, for example, receive and store the exercise data from the electronic cap 111. In addition, according to an embodiment of the present disclosure, the mobile phone 127 may control the electronic watch 119 to receive the exercise data measured by the electronic cap 111 from the electronic cap 111. According to an embodiment of the present disclosure, when the mobile phone 127 requests the exercise data measured by the electronic cap 111, the mobile phone 127 may receive the measured exercise data from the electronic cap 111. Additionally or alternatively, for example, the electronic watch 119 may receive the exercise data measured by the electronic cap 111 and store the aggregate of the received exercise data. In the case in which the mobile phone 127 requests the accumulated exercise data, the mobile phone 127 may receive the accumulated exercise data from the electronic watch 119.

Figure 4B:
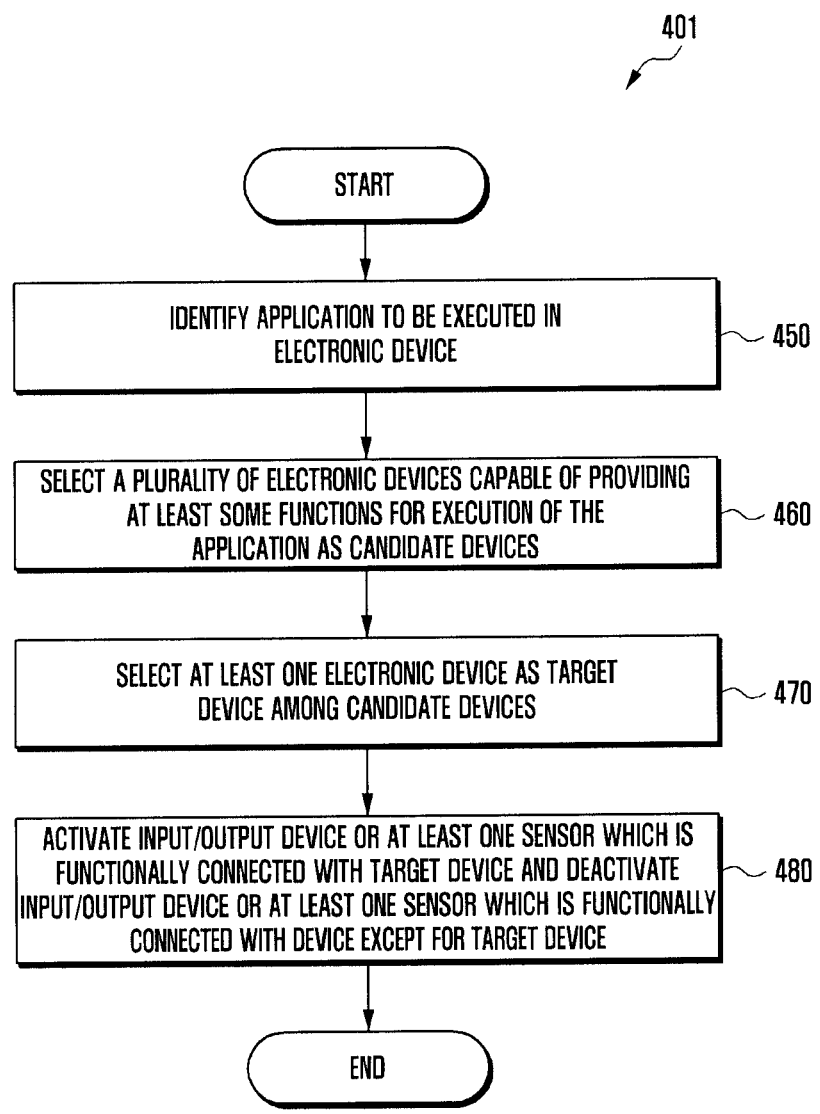
FIG. 4b is a flowchart illustrating a method by which an electronic device controls one or more electronic devices that communicate with the electronic device according to various embodiments of the present disclosure.

FIG. 4b is a flowchart 401 illustrating a method by which an electronic device (e.g., electronic device 201) controls one or more electronic devices that communicate with the electronic device according to various embodiments of the present disclosure. In operation 450, the electronic device (e.g., identification module 310) may identify the application (e.g., an application for measuring the amount of exercise of the user 101) to be executed in the electronic device (e.g., mobile phone 127). In operation 460, the electronic device (e.g., selection module 330) may select a plurality of electronic devices (e.g., mobile phone 127, electronic cap 111, electronic watch 119 or electronic shoes 121), which are able to provide at least some functions (e.g., function of obtaining or outputting data to execute the application) for the execution of the application, as the candidate devices.

In operation 470, the electronic device (e.g., determination module 340) may select at least one electronic device as the target device (e.g., electronic shoes 121) among the candidate devices (e.g., mobile phone 127, electronic cap 111, electronic watch 119 or electronic shoes 121. In operation 480, the electronic (e.g., execution module 350) may activate the input/output device or at least one sensor (e.g., acceleration sensor that is functionally connected with the electronic shoes 121), which is functionally connected with the target device and provides at least some functions for execution of the application, and deactivate the input/output device or at least one sensor (e.g., acceleration sensor that is functionally connected with at least one of the mobile phone 127, the electronic cap 111 or the electronic watch 119) of the remaining devices, including the electronic device and the non-selected candidate devices (e.g., mobile phone 127, electronic cap 111 or electronic watch 119) that are related to the same at least some functions with respect to execution of the application.

According to various embodiments of the present disclosure, a method for controlling one or more devices in proximity by using an electronic device may include operation of identifying an application (e.g., phone call application) to be executed in the first electronic device (e.g., mobile phone 127 or electronic device 201), operation of selecting a plurality of electronic devices (e.g., mobile phone 127 or electronic glasses 113) which are able to provide at least some functions (e.g., function of obtaining voice data to be used in the phone call application) available to the execution of the application, among the first electronic device and one or more devices (e.g., electronic devices 111 to 137) which communicate with the first electronic device (or which are in proximity to the first electronic device), operation of selecting at least one device (e.g., electronic glasses 113) of the plurality of electronic devices as the second electronic device (e.g., target device), based on at least one of status information and position information of the plurality of electronic devices or properties of the data (e.g., voice data) corresponding to the functions, by using the first electronic device, and operation of executing the application in the first electronic device by using the at least some functions of the second electronic device.

According to various embodiments of the present disclosure, the operation of selecting may include operation of identifying the at least one electronic device within a specified distance from the user (e.g., the user 101) corresponding to the first electronic device.

According to various embodiments of the present disclosure, at least some of the plurality of electronic devices may be worn or attached onto body parts of the user (e.g., the user 101) corresponding to the first electronic device.

According to various embodiments of the present disclosure, the operation of determining may include operation of receiving the data from the plurality of electronic devices and operation of selecting the at least one electronic device, based on the amplitude or the noise level of signal in the properties of the data.

According to various embodiments of the present disclosure, the operation of determining may include operation of receiving the data from the plurality of electronic devices, operation of comparing patterns of the properties of the data with a data pattern designated in the application, and operation of selecting the at least one electronic device, based on the comparison result. For example, the operation of determining may include operation of selecting at least one electronic device corresponding to the designated data pattern, based on the determination that the data pattern corresponds to the designated data pattern.

According to various embodiments of the present disclosure, the operation of determining may include operation of comparing status information, position information of the plurality of electronic devices or the properties of data with the corresponding information of status information, position information or the properties of data, which are designated in the application, and operation of giving priority to the plurality of electronic devices or the status information, the position information or the properties of data, and operation of selecting the at least one electronic device according to the priority.

According to various embodiments of the present disclosure, the operation of determining may include operation of obtaining the position information (e.g., position information of mobile phone 127, i.e., "leg", or position information of electronic glasses 113, i.e., "head") from the plurality of electronic devices (e.g., mobile phone 127 or electronic glasses 113), and operation of selecting a device (e.g., electronic glasses 113), which is positioned on the user's body part (e.g., "head") corresponding to the application, as the at least one device.

According to various embodiments of the present disclosure, the operation of executing may include operation of obtaining the data from the second electronic device by using the first electronic device, and operation of executing the application by using the data.

According to various embodiments of the present disclosure, the operation of executing may include operation of obtaining the data (e.g., acceleration data available to the gesture recognition application) from the second electronic device (e.g., electronic watch 119), and operation of determining the user's gesture (e.g., gesture of waving arms) corresponding to the second electronic device, based on the data.

According to various embodiments of the present disclosure, the operation of determining may include operation of obtaining the position information (e.g., "arm") corresponding to the second electronic device (e.g., electronic watch 119), and the operation of executing may include operation of determining the position of the first electronic device (e.g., mobile phone 127) or the position of the third electronic device (e.g., tablet PC 129) that is positioned within a predetermined distance from the second electronic device by using the position information corresponding to the second electronic device.

According to various embodiments of the present disclosure, the operation of determining may include operation of obtaining the first data (e.g., acceleration data) from the second electronic device (e.g., electronic watch 119) and obtaining the second data (e.g., acceleration data) from the first electronic device (e.g., mobile phone 127) or the third electronic device (e.g., tablet PC 129), operation of determining the position of the first electronic device or the third electronic device, operation of comparing the pattern of the signal corresponding to the first data with the pattern of the signal corresponding to the second data, and operation of determining whether the difference between the patterns of the first data and the second data, respectively, is within a predetermined range. According to an embodiment of the present disclosure, if the difference between the patterns of the signal data is within the predetermined range, the position of the device (e.g., mobile phone 127 or tablet PC 129) corresponding to the second data may be determined as the position (e.g., "arm") of the second electronic device.

According to various embodiments of the present disclosure, the operation of executing may include operation of activating an input/output device or at least one sensor, which is functionally connected with the second electronic device (e.g., electronic glasses 113) and related to the function, and operation of deactivating an input/output device or at least one sensor module, which is functionally connected with the device(s) (e.g., mobile phone 127) except for the second electronic device among the plurality of electronic devices (e.g., mobile phone 127 or electronic glasses 113) and related to the function.

According to various embodiments of the present disclosure, in the case of the first electronic device (e.g., electronic device 201) that is included in the second electronic device, the operation of executing may include operation of obtaining the data from a memory (e.g., memory 230) that is locally connected with the first electronic device.

According to various embodiments of the present disclosure, the plurality of electronic devices (e.g., mobile phone 127 or electronic glasses 113) may include the third electronic device (e.g., electronic glasses 113), and the operation of determining in the electronic device (e.g., tablet PC 129) may be performed based on the third electronic device selecting the at least one electronic device (e.g., mobile phone 127) as the second electronic device.

According to various embodiments of the present disclosure, the operation of executing may include operation of obtaining the data by the electronic device (e.g., tablet PC 129) through the third electronic device (e.g., electronic glasses 113), and operation of executing the application by using the data.

According to various embodiments of the present disclosure, a method for controlling one or more devices in proximity by using an electronic device may include operation of identifying an application (e.g., healthcare application) to be executed in the first electronic device (e.g., electronic device 201 or mobile phone 127), operation of selecting a plurality of electronic devices (e.g., electronic watch 119 or electronic shoes 121) which are able to execute at least some functions (e.g., function of obtaining exercise data) related to the application, among the first electronic device and one or more devices (e.g., electronic glasses 113, electronic watch 119, electronic shoes 121 or game console 133) which communicate with the first electronic device, operation of determining at least one device (e.g., electronic shoes 121) of the plurality of electronic devices as the second electronic device (e.g., target device), operation of activating an input/output device or at least one sensor (e.g., acceleration sensor or gyro-sensor), which is functionally connected with the second electronic device and related to the function, and operation of deactivating an input/output device or at least one sensor (e.g., acceleration sensor or gyro-sensor), which is functionally connected with the device(s) (e.g., electronic watch 119) except for the second electronic device among the plurality of electronic devices and related to the function.

Figure 5:
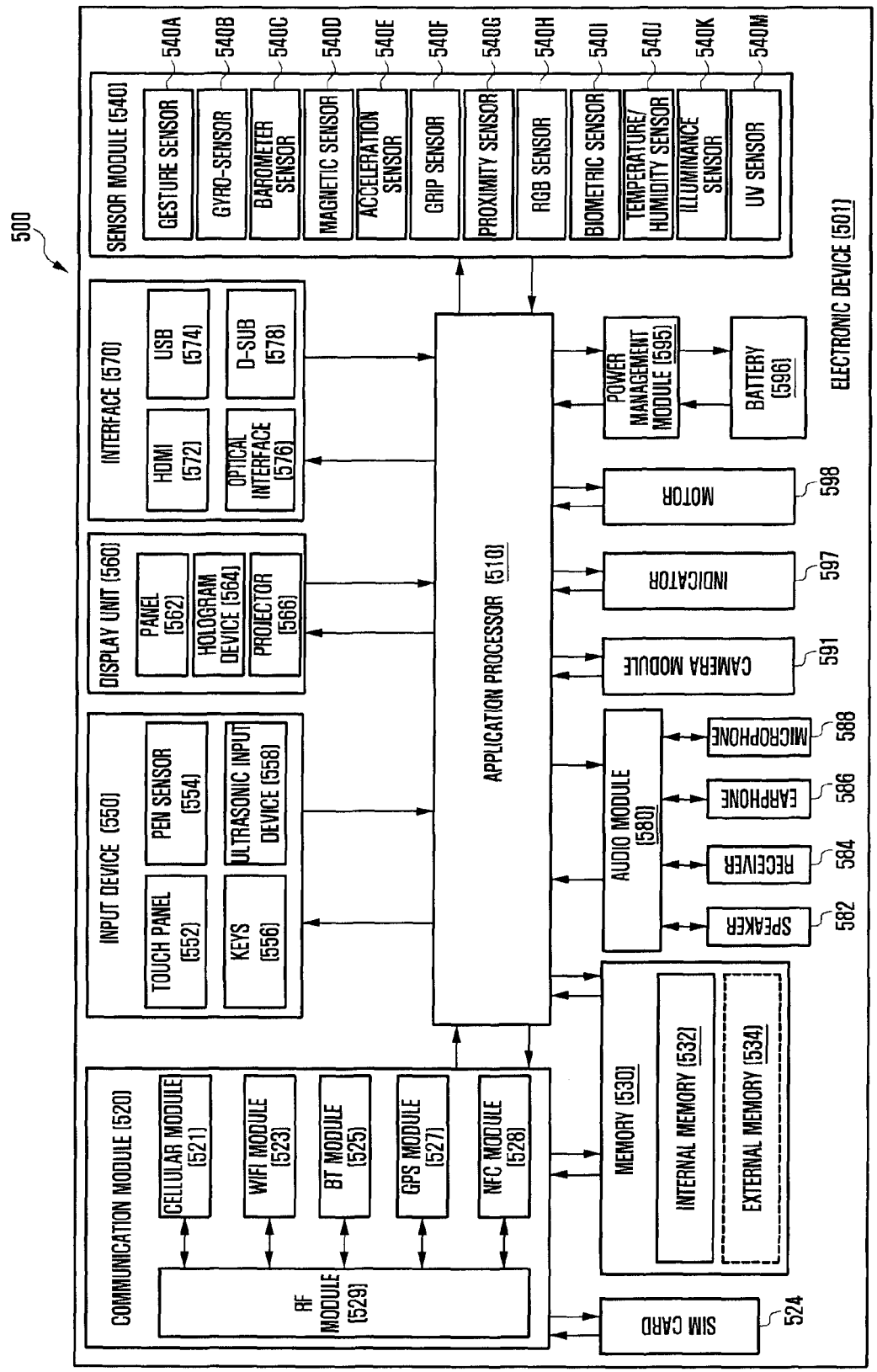
FIG. 5 is a block diagram of an electronic device according to various embodiments of the present disclosure.

FIG. 5 is a block diagram illustrating a configuration of the electronic device according to various embodiments of the present disclosure. The electronic device 501 may be of the whole or a part of the electronic device 201. Referring to FIG. 5, the electronic device 501 may include an Application Processor (AP) 510, a communication module 520, a Subscriber Identity Module (SIM) card 524, a memory 530, a sensor module 540, an input device 550, a display 560, an interface 570, an audio module 580, a camera module 591, a power management module 595, a battery 596, an indicator 597, and a motor 598.

The AP 510 may operate an Operating System (OS) and/or application programs to control a plurality of hardware and/or software components connected to the AP 510 and perform data-processing and operations on multimedia data. For example, the AP 510 may be implemented in the form of System on Chip (SoC). According to an embodiment, the AP 510 may include a Graphic Processing Unit (GPU) (not shown).

The communication module 520 (e.g. communication interface 260) may perform data communication with other electronic devices (e.g. electronic device 204 and server 206) through a network. According to an embodiment, the communication module 520 may include a cellular module 521, a Wi-Fi module 523, a BT module 525, a GPS module 527, an NFC module 528, and a Radio Frequency (RF) module 529.

The cellular module 521 is responsible for voice and video communication, text messaging, and Internet access services through a communication network (e.g. LTE, LTE-A, CDMA, WCDMA, UMTS, WiBro, and GSM networks). The cellular module 521 may perform identification and authentication of electronic devices in the communication network using the SIM card 524. According to an embodiment, the cellular module 521 may perform at least one of the functions of the AP 510. For example, the cellular module 521 may perform at least a part of the multimedia control function.

According to an embodiment, the cellular module 521 may include a Communication Processor (CP). The cellular module 521 may be implemented in the form of SOC. Although the cellular module 521 (e.g. communication processor), the memory 530, and the power management module 595 are depicted as independent components separated from the AP 510, the present disclosure is not limited thereto but may be embodied in a way that the AP includes at least one of the components (e.g. cellular module 521).

According to an embodiment, each of the AP 510 and the cellular module 521 (e.g. communication processor) may load a command or data received from at least one of the components on a non-volatile or volatile memory and process the command or data. The AP 510 or the cellular module 521 may store the data received from other components or generated by at least one of other components in the non-volatile memory.

Each of the Wi-Fi module 523, the BT module 525, the GPS module 527, and the NFC module 528 may include a processor for processing the data it transmits/receives. Although the cellular module 521, the Wi-Fi module 523, the BT module 525, the GPS module 527, and the NFC module 528 are depicted as independent blocks; at least two of them (e.g. communication processor corresponding to the cellular module 521 and Wi-Fi processor corresponding to the Wi-Fi module 523) may be integrated in the form of SoC.

The RF module 529 is responsible for data communication, e.g. transmitting/receiving RF signals. Although not depicted, the RF module 529 may include a transceiver, a Power Amp Module (PAM), a frequency filter, and a Low Noise Amplifier (LNA). The RF module 529 also may include the elements for transmitting/receiving electric wave in free space, e.g. conductor or conductive wire. Although FIG. 5 is directed to the case where the Wi-Fi module 523, the BT module 525, the GPS module 527, and the NFC module 528 are sharing the RF module 529, the present disclosure is not limited thereto but may be embodied in a way that at least one of the Wi-Fi module 523, the BT module 525, the GPS module 527, and the NFC module 528 transmits/receives RF signals an independent RF module.

The SIM card 524 may be designed so as to be inserted into a slot formed at a predetermined position of the electronic device. The SIM card 524 may store unique identity information (e.g. Integrated Circuit Card Identifier (ICCID)) or subscriber information (e.g. International Mobile Subscriber Identity (IMSI)).

The memory 530 (e.g. memory 230) may include at least one of the internal memory 532 and an external memory 534. The internal memory 532 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 532 may be a Solid State Drive (SSD). The external memory 534 may be a flash drive such as Compact Flash (CF), Secure Digital (SD), micro-SD, Mini-SD, extreme Digital (xD), and Memory Stick. The external memory 934 may be connected to the electronic device 501 through various interfaces functionally. According to an embodiment, the electronic device 901 may include a storage device (or storage medium) such as hard drive.

The sensor module 540 may measure physical quantity or check the operation status of the electronic device 501 and convert the measured or checked information to an electric signal. The sensor module 540 may include at least one of gesture sensor 540A, Gyro sensor 540B, atmospheric pressure sensor 540C, magnetic sensor 540D, acceleration sensor 540E, grip sensor 540F, proximity sensor 540G, color sensor 540H (e.g. Red, Green, Blue (RGB) sensor), bio sensor 540I, temperature/humidity sensor 540J, illuminance sensor 540K, and Ultra Violet (UV) sensor 540M. Additionally or alternatively, the sensor module 540 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 540 may further include a control circuit for controlling at least one of the sensors included therein.

The input device 550 may include a touch panel 552, a (digital) pen sensor 554, keys 556, and an ultrasonic input device 558. The touch panel 552 may be one of capacitive, resistive, infrared, microwave type touch panel. The touch panel 552 may include a control circuit. In the case of the capacitive type touch panel, it is possible to detect physical contact or approximation. The touch panel 552 may further include a tactile layer. In this case, the touch panel 952 may provide the user with haptic reaction.

The (digital) pen sensor 554 may be implemented with a sheet with the same or similar way as touch input of the user or a separate recognition sheet. The keys 556 may include physical buttons, optical key, and keypad. The ultrasonic input device 558 is a device capable of checking data by detecting sound wave through a microphone 588 and may be implemented for wireless recognition. According to an embodiment, the electronic device 501 may receive the user input made by means of an external device (e.g. computer or server) connected through the communication module 520.

The display 560 (e.g. display module 150) may include a panel 562, a hologram device 564, and a projector 566. The panel 562 may be a Liquid Crystal Display (LCD) panel or an Active Matrix Organic Light Emitting Diodes (AMO-LED) panel. The panel 562 may be implemented so as to be flexible, transparent, and/or wearable. The panel 562 may be implemented as a module integrated with the touch panel 552. The hologram device 564 may present 3-dimensional image in the air using interference of light. The projector 566 may project an image to a screen. The screen may be placed inside or outside the electronic device. According to an embodiment, the display 560 may include a control circuit for controlling the panel 562, the hologram device 564, and the projector 566.

The interface 570 may include a High-Definition Multimedia Interface (HDMI) 572, a Universal Serial Bus (USB) 574, an optical interface 576, and a D0subminiature (D-sub) 578. The interface 570 may include the communication interface 260 as shown in FIG. 2. Additionally or alternatively, the interface 570 may include a Mobile High-definition Link (MHL) interface, a SD/MMC card interface, and infrared Data Association (irDA) standard interface.

The audio module 580 may convert sound to electric signal and vice versa. At least a part of the audio module 580 may be included in the input/output interface 240 as shown in FIG. 2. The audio module 580 may process the audio information input or output through the speaker 582, the receiver 584, the earphone 586, and the microphone 588.

The camera module 591 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 595 may manage the power of the electronic device 501. Although not shown, the power management module 595 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 596, charging voltage, current, and temperature. The battery 596 may store or generate power and supply the stored or generated power to the electronic device 501. The battery 596 may include a rechargeable battery or a solar battery.

The indicator 597 may display operation status of the electronic device 501 or a part of the electronic device, booting status, messaging status, and charging status. The motor 598 may converts the electronic signal to mechanical vibration. Although not shown, the electronic device 901 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

As described above, the text display method and apparatus of an electronic device of the present disclosure reduces a number of page scrolls by discerning the paragraphs included in a text document and folding the paragraphs to present parts of the respective paragraphs.

Also, the text display method and apparatus of an electronic device of the present disclosure increases the legibility of the text in such a way of enlarging, when a folded paragraph is stretched, the font size of the paragraph or highlighting the paragraph.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

Figure 6:
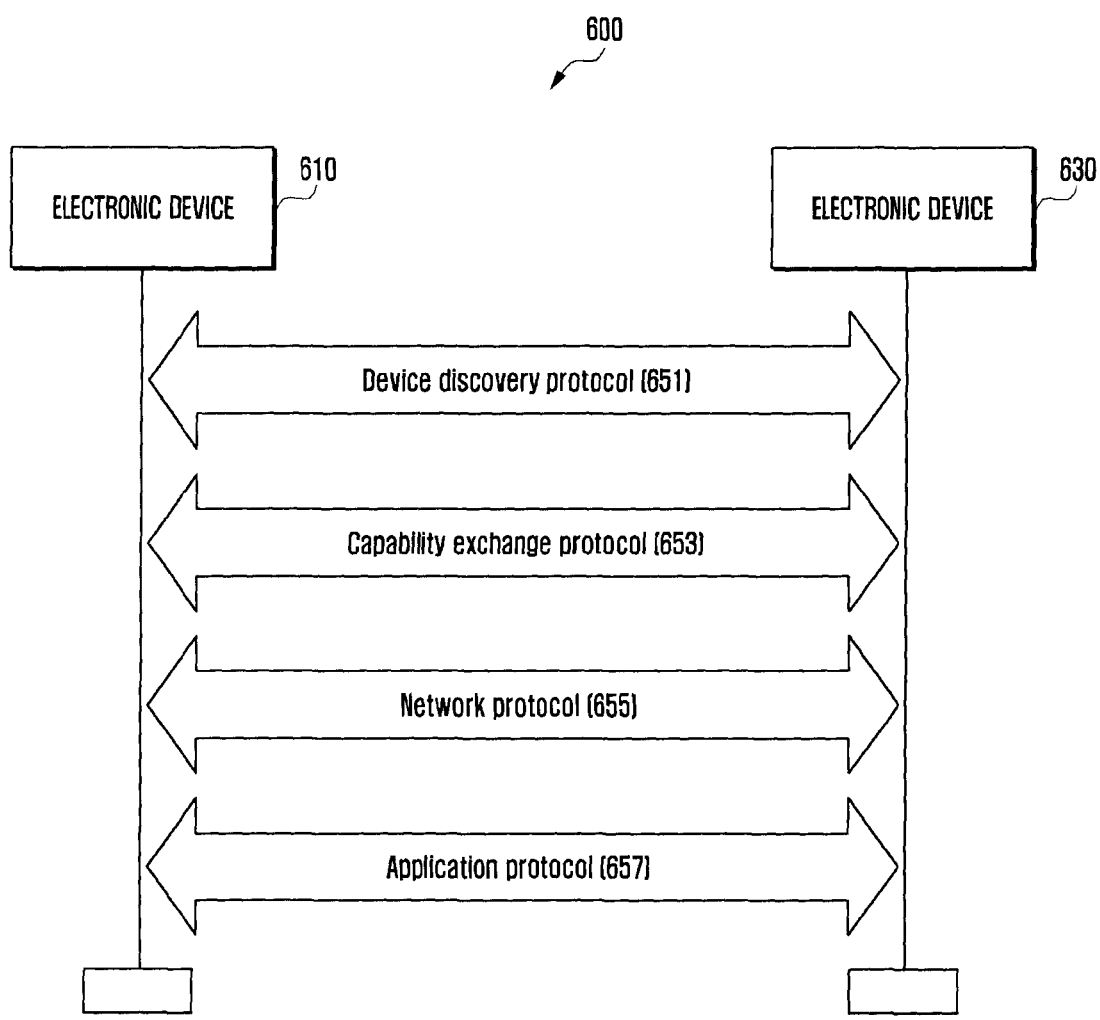
FIG. 6 illustrates communication protocols between a plurality of electronic devices according to various embodiments of the present disclosure.

FIG. 6 illustrates communication protocols 600 between a plurality of electronic devices (e.g., an electronic device 610 and an electronic device 630) according to various embodiments.

For example, the communication protocols 600 may include a device discovery protocol 651, a capability exchange protocol 653, a network protocol 655, and an application protocol 657.

According to an embodiment, the device discovery protocol 651 may be a protocol by which the electronic devices (e.g., the electronic device 610 and the electronic device 630) detect external devices capable of communicating with the electronic devices, or connect with the detected external electronic devices. For example, the electronic device 610 (e.g., the electronic device 101) may detect the electronic device 630 (e.g., the electronic device 104) as an electronic device capable of communicating with the electronic device 610 through communication methods (e.g., WiFi, BT, USB, or the like) which are available in the electronic device 610, by using the device discovery protocol 651. In order to connect with the electronic device 630 for communication, the electronic device 610 may obtain and store identification information on the detected electronic device 630, by using the device discovery protocol 651. The electronic device 610 may initiate the communication connection with the electronic device 630, for example, based on at least the identification information.

According to an embodiment, the device discovery protocol 651 may be a protocol for authentication between a plurality of electronic devices. For example, the electronic device 610 may perform authentication between the electronic device 610 and the electronic device 630, based on at least communication information {e.g., Media Access Control (MAC), Universally Unique Identifier (UUID), Subsystem Identification (SSID), Internet Protocol (IP) address} for connection with the electronic device 630.

According to an embodiment, the capability exchange protocol 653 may be a protocol for exchanging information related to service functions which can be supported by at least one of the electronic device 610 or the electronic device 630. For example, the electronic device 610 and the electronic device 630 may exchange information on service functions which are currently supported by each electronic device with each other through the capability exchange protocol 653. The exchangeable information may include identification information indicating a specific service among a plurality of services supported by the electronic device 610 and the electronic device 630. For example, the electronic device 610 may receive identification information for a specific service provided by the electronic device 630 from the electronic device 630 through the capability exchange protocol 653. In this case, the first electronic device 610 may determine whether the electronic device 610 can support the specific service, based on the received identification information.

According to an embodiment, the network protocol 655 may be a protocol for controlling the data flow which is transmitted and received between the electronic devices (e.g., the electronic device 610 and the electronic device 630) connected with each other for communication, for example, in order to provide interworking services. For example, at least one of the electronic device 610 or the electronic device 630 may perform the error control or the data quality control, by using the network protocol 655. Alternatively or additionally, the network protocol 655 may determine the transmission format of data transmitted and received between the electronic device 610 and the electronic device 630. In addition, at least one of the electronic device 610 or the electronic device 630 may manage a session (e.g., session connection or session termination) for the data exchange between them, by using the network protocol 655.

According to an embodiment, the application protocol 657 may be a protocol for providing a procedure or information to exchange data related to services which are provided to the external devices. For example, the electronic device 610 (e.g., the electronic device 101) may provide services to the electronic device 630 (e.g., the electronic device 104 or the server 106) through the application protocol 657.

According to an embodiment, the communication protocol 600 may include pre-defined communication protocols, communication protocols designated by individuals or groups (e.g., communication protocols designated by communication device manufacturers or network providers), or a combination thereof.

The term "module" used in the present disclosure can refer to, for example, a unit including one or more combinations of hardware, software, and firmware. The "module" can be interchangeable with a term, such as "unit," "logic," "logical block," "component," "circuit," or the like. The "module" can be a minimum unit of a component formed as one body or a part thereof. The "module" can be a minimum unit for performing one or more functions or a part thereof. The "module" can be implemented mechanically or electronically. For example, the "module" according to an embodiment of the present disclosure can include at least one of an Application-Specific Integrated Circuit (ASIC) chip, a Field-Programmable Gate Array (FPGA), and a programmable-logic device for performing certain operations which have been known or are to be developed in the future.

According to various embodiments, at least a part of a device (for example, modules or functions thereof) or a method (for example, operations) according to the present disclosure can be implemented by, for example, an instruction stored in a computer-readable storage medium provided in a form of a programming module. When the instruction is executed by one or more processors (for example, the processor 210), the one or more processors can perform a function corresponding to the command. The computer-readable storage medium can be, for example, the memory 220. At least a part of the programming module can be implemented (for example, executed) by, for example, the processor 210. At least a part of the programming module can include, for example, a module, a program, a routine, a set of instructions and/or a process for performing one or more functions.

The computer-readable storage medium can include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, a programming module), such as a Read Only Memory (ROM), a Random Access Memory (RAM), a flash memory and the like. Further, the program instruction can include high class language codes, which can be executed in a computer by using an interpreter, as well as machine codes made by a compiler. The aforementioned hardware device can be configured to operate as one or more software modules in order to perform the operation of the present disclosure, and vice versa The programming module according to the present disclosure can include one or more of the aforementioned components or can further include other additional components, or some of the aforementioned components can be omitted. Operations executed by a module, a programming module, or other components according to the present disclosure can be executed sequentially, in parallel, repeatedly, or in a heuristic manner. Further, some operations can be executed according to another order or can be omitted, or other operations can be added.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

According to various embodiments of the present disclosure, there is provided a recording medium for storing instructions which are performed by at least one processor to thereby instruct the at least one processor to execute at least one operation, wherein the at least one operation may include operation of identifying an application to be executed in the first electronic device, operation of selecting a plurality of electronic devices which are able to execute at least some functions available to execution of the application, among the first electronic device and one or more devices that communicate with the first electronic device, operation of determining at least one device of the plurality of electronic devices as the second electronic device, operation of activating an input/output device or at least one sensor, which is functionally connected with the second electronic device and related to the function, and operation of deactivating an input/output device or at least one sensor, which is functionally connected with the devices except for the second electronic device among the plurality of electronic devices and related to the function.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method comprising:
    identifying an application among a plurality of applications to be executed in a first electronic device communicatively coupled with a plurality of electronic devices, each application in the plurality of applications adapted to transmit data to or receive data from the plurality of electronic devices;
    selecting candidate devices from the plurality of electronic devices, the candidate devices having at least one function associated with the application;
    selecting a second electronic device from among the candidate devices based factor including:
        status information of each of the candidate devices including remaining battery percentage for each of the candidate devices, and
        position information of each of the candidate devices in relation to at least one of a user or the first electronic device; and
    executing the application in the first electronic device utilizing the at least one function of the second electronic device, wherein executing the application comprises:
        transmitting an instruction to the second electronic device activating an input/output device or at least one sensor related to the at least one function, and
        transmitting an instruction to each of the candidate devices except for the second electronic device deactivating a corresponding input/output device or at least one corresponding sensor module related to the at least one function.

2. The method of claim 1, wherein the selecting the candidate devices further comprises identifying any of the plurality of electronic devices disposed within a specified distance from the user.

3. The method of claim 1, wherein selecting the second electronic device further comprises:
    receiving data associated with the at least one function from each of the candidate devices; and
    selecting the second electronic device based on a comparison of an amplitude and/or a noise level of the data received from each candidate device.

4. The method of claim 1, wherein selecting the second electronic device further comprises:
    receiving data associated with the at least one function from each of the candidate devices;
    comparing a pattern of the data with a data pattern designated by the application; and
    selecting the second electronic device having the pattern of the data closest to the data pattern designated by the application.

5. The method of claim 1, wherein selecting the second electronic device further comprises:
    comparing at least one of the factors to a comparison factor designated by the application;
    assigning priorities to each of the candidate devices based on a result of the comparison; and
    selecting the second electronic device according to the assigned priorities.

6. The method of claim 1, wherein executing the application further comprises:
    receiving data from only the second electronic device; and
    executing the application on the first electronic device using the received data.

7. The method of claim 1, wherein executing the application further comprises:
    receiving data from the second electronic device; and
    detecting by the first electronic device a gestural input detected by the second electronic device using the received data.

8. The method of claim 1, wherein:
    selecting the second electronic device further comprises receiving position information from the second electronic device; and
    executing the application further comprises detecting a position of the first electronic device or another candidate electronic device that is disposed within a predetermined distance from the second electronic device as indicated by position information of the second electronic device.

9. The method of claim 1, further comprising:
    receiving a first data from the second electronic device; and
    receiving a second data from the first electronic device or another candidate electronic device,
    wherein selecting the second electronic device further comprises:
        comparing a signal pattern of the first data with a signal pattern of the second data; and
        detecting whether a difference between the signal pattern of the first data and the signal pattern of the second data is within a predetermined range.

10. The method of claim 1, wherein executing the application further comprises:
    retrieving the data from a memory locally coupled to the first electronic device; and
    executing the application using the retrieved data.

11. The method of claim 1, wherein the candidate devices comprises a third electronic device, the method further comprising selecting a third electronic device from the candidate devices for executing the application.

12. The method of claim 11, wherein executing the application further comprises:
    retrieving data from the third electronic device; and
    executing the application using the data from the third electronic device.

13. A first electronic device comprising:
    a communication interface adapted to allow communicative coupling with a plurality of electronic devices; and
    a processor configured to:
        identify an application among a plurality of applications to be executed in the first electronic device, each application in the plurality of applications adapted to transmit data to or receive data from the plurality of electronic devices;

select candidate devices from the plurality of electronic devices having at least one function associated with the application;
select a second electronic device from among the candidate devices based on factors including:
status information of each of the candidate devices including remaining battery percentage for each of the candidate devices, and
position information of each of the candidate devices in relation to at least one of a user or the first electronic device; and
execute the application in the first electronic device utilizing the at least one function of the second electronic device, wherein to execute the application, the processor is further configured to:
transmit an instruction to the second electronic device activating an input/output device or at least one sensor related to the at least one function; and
transmit an instruction to each of the candidate devices except for the second electronic device deactivating a corresponding input/output device or at least one corresponding sensor module related to the at least one function.

14. The first electronic device of claim 13, wherein the plurality of electronic devices comprise devices that are worn or attached on body parts of the user of the first electronic device.

15. The first electronic device of claim 13, wherein the processor is further configured to retrieve position information from each of the candidate devices, and select the second electronic device based on position information of the second electronic device best matching a position designated by the application.

16. The first electronic device of claim 13, wherein the processor is further configured to retrieve data from each of the candidate devices and select the second electronic device based on a comparison of an amplitude and/or a signal noise level of the retrieved data from each of the candidate devices.

17. The first electronic device of claim 13, wherein the processor is further configured to retrieve data from each of the candidate devices and select the second electronic device based on comparing a pattern of each retrieved data from each of the candidate devices with a data pattern designated by the application.

18. A computer-readable recording medium storing programs for executing operations of:
identifying an application among a plurality of applications to be executed in a first electronic device communicatively coupled with a plurality of electronic devices, each application in the plurality of applications adapted to transmit data to or receive data from the plurality of electronic devices;
selecting candidate devices from the plurality of electronic devices, the candidate devices having at least one function associated with the application;
selecting a second electronic device from among the candidate devices based on factors including:
status information of each of the candidate devices including remaining battery percentage for each of the candidate devices, and
position information of each of the candidate devices in relation to at least one of a user or the first electronic device; and
executing the application in the first electronic device utilizing the at least one function of the second electronic device, wherein executing the application comprises:
transmitting an instruction to the second electronic device activating an input/output device or at least one sensor related to the at least one function; and
transmitting an instruction to each of the candidate devices except for the second electronic device deactivating a corresponding input/output device or at least one corresponding sensor module related to the at least one function.

* * * * *